March 31, 1970    E. R. McCLELLAND ET AL    3,503,485
APPARATUS FOR AUTOMATICALLY FEEDING, ORIENTING AND
PITTING DRUPE HALVES AND METHOD
Filed Nov. 14, 1967      5 Sheets-Sheet 1
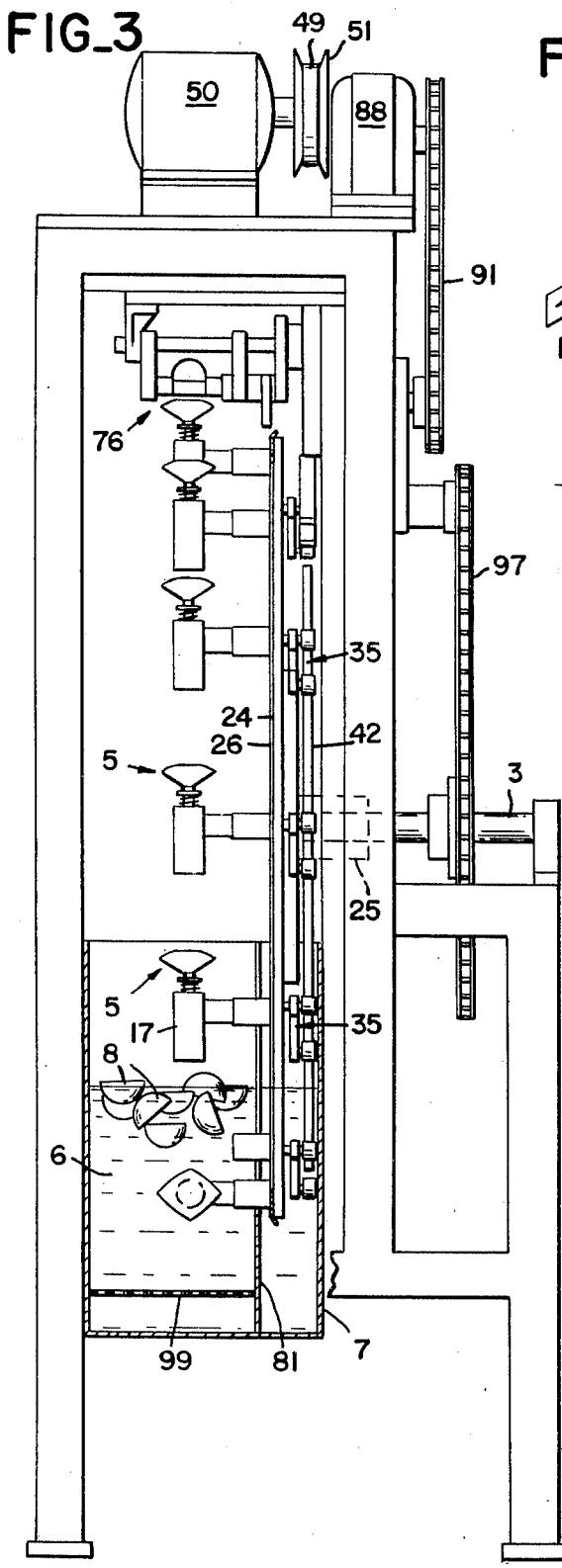
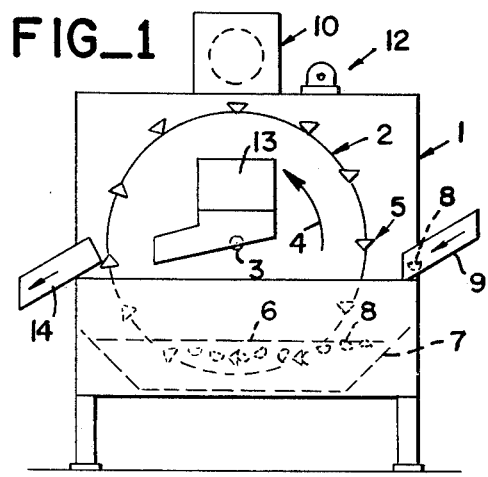
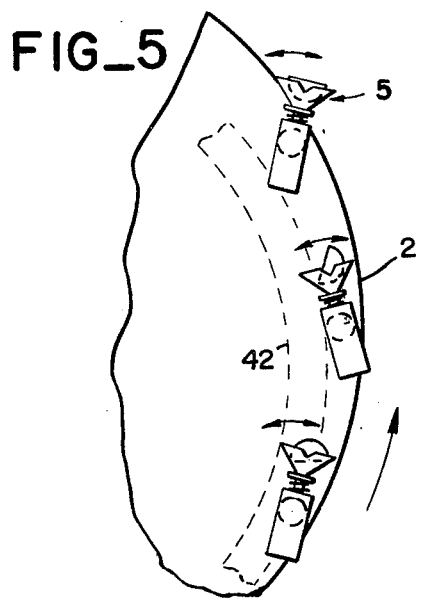
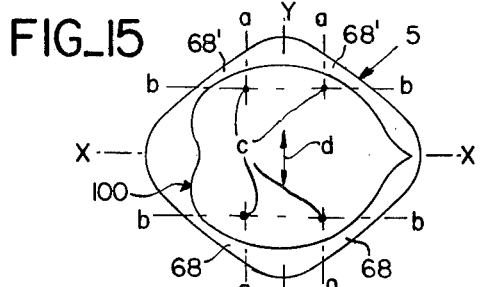
INVENTORS
ETHERIDGE R. McCLELLAND
HENRY L. SPENCE
BY
ATTORNEYS

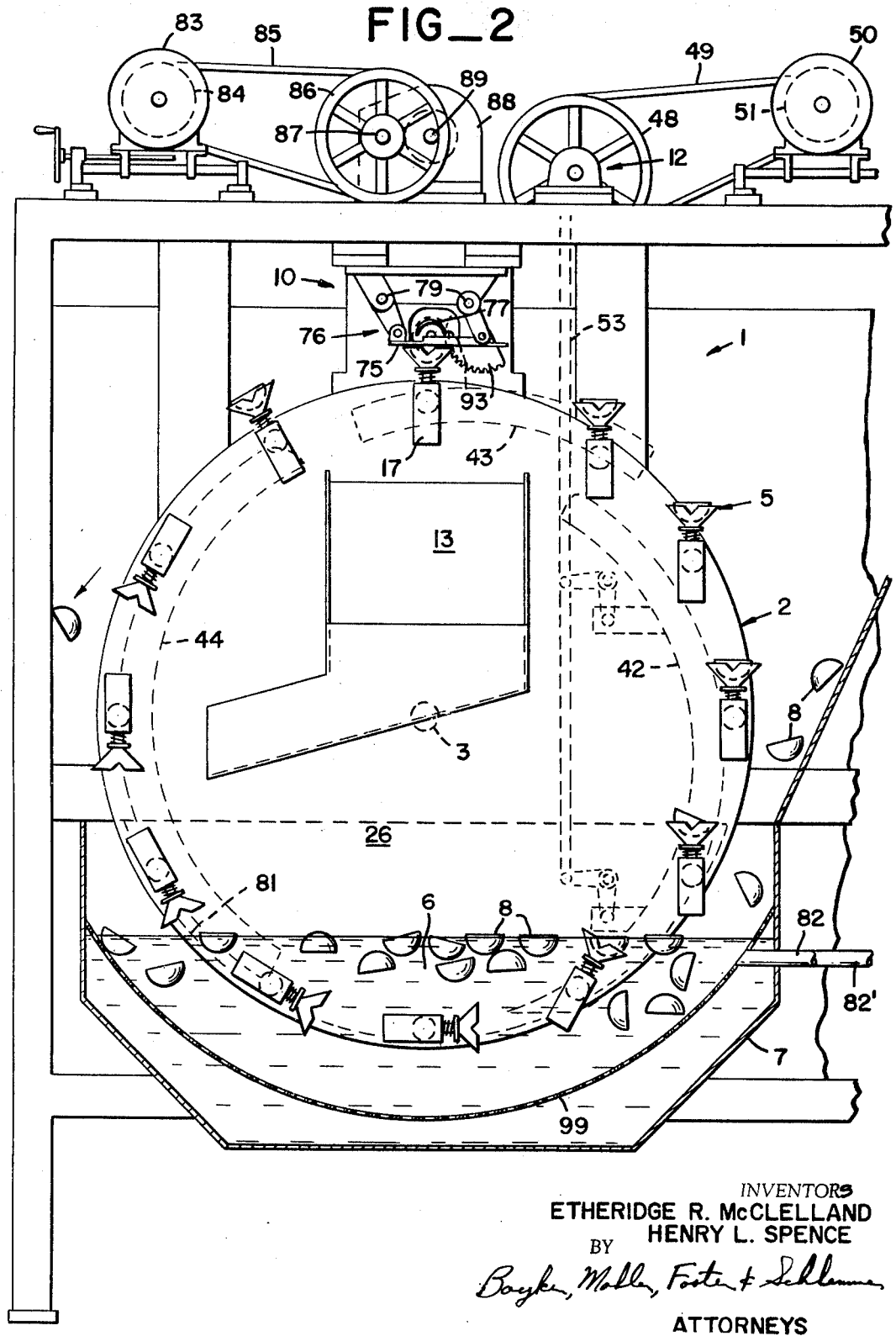

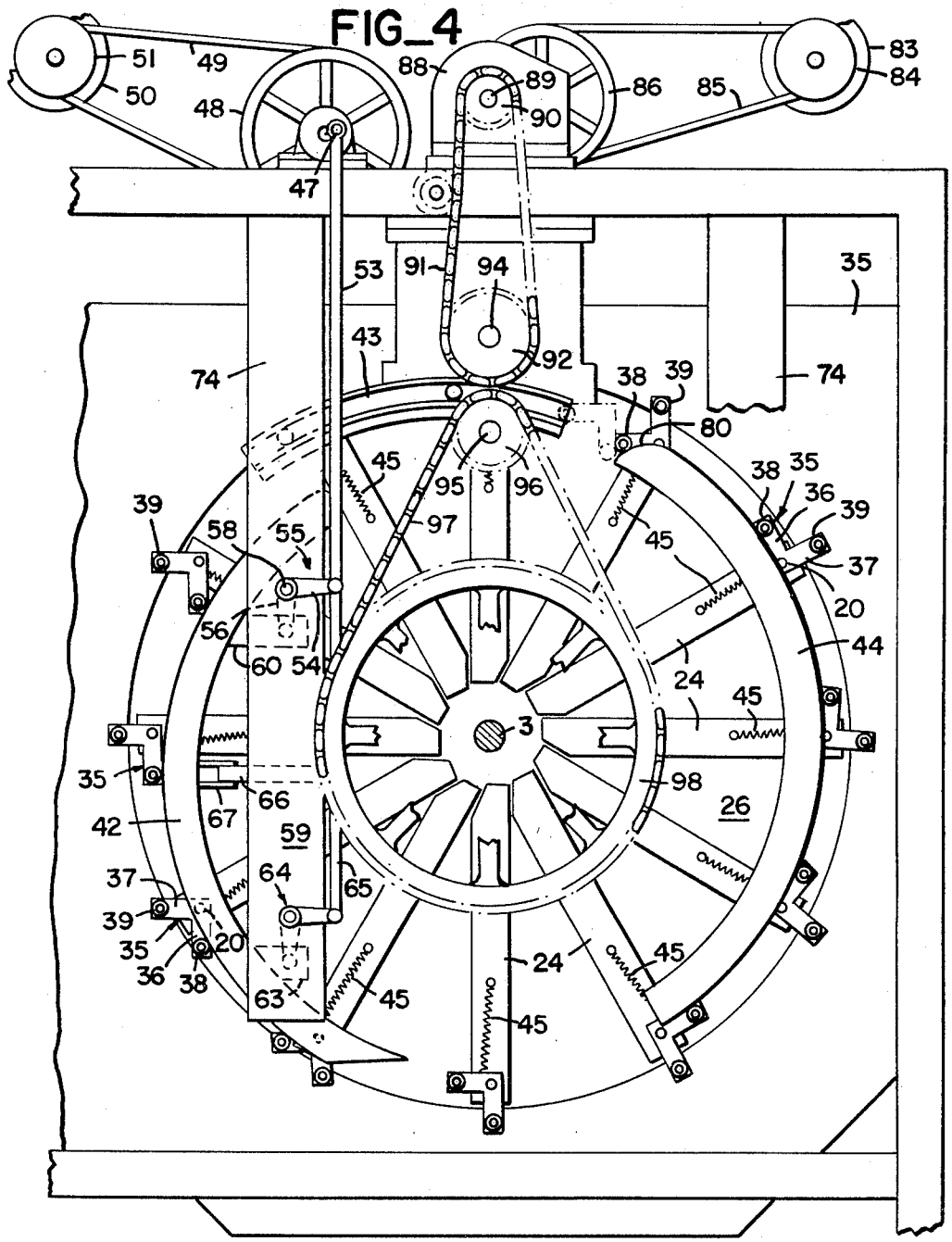

March 31, 1970  E. R. McCLELLAND ET AL  3,503,485
APPARATUS FOR AUTOMATICALLY FEEDING, ORIENTING AND
PITTING DRUPE HALVES AND METHOD
Filed Nov. 14, 1967  5 Sheets-Sheet 4
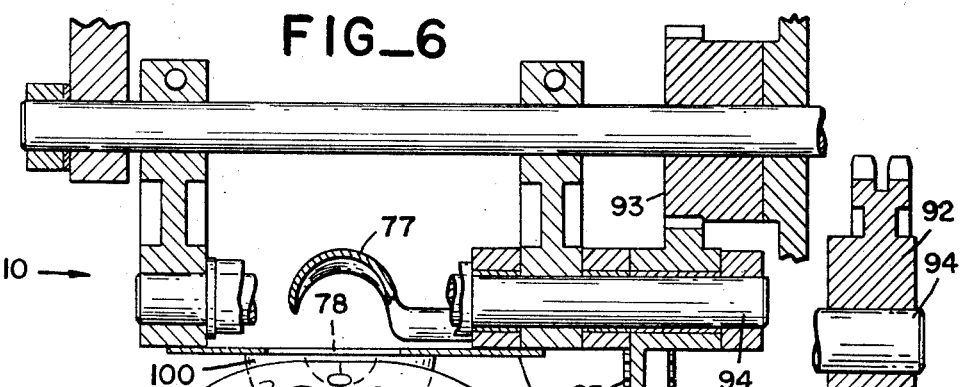
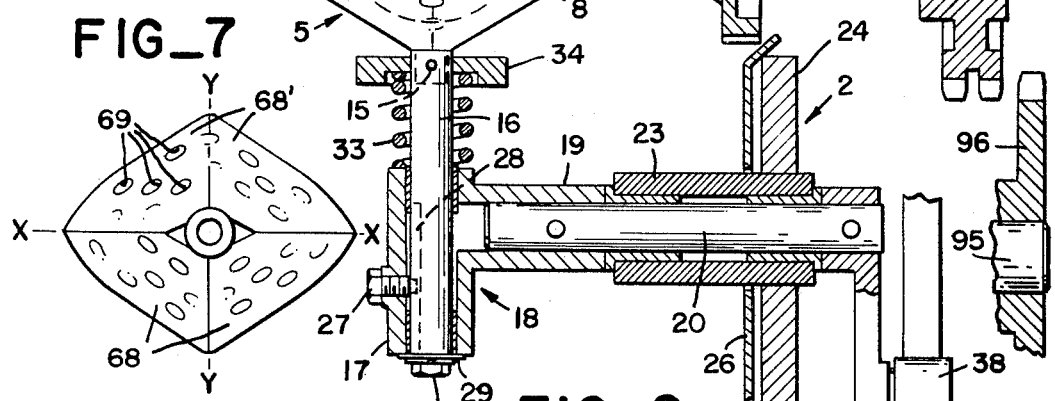
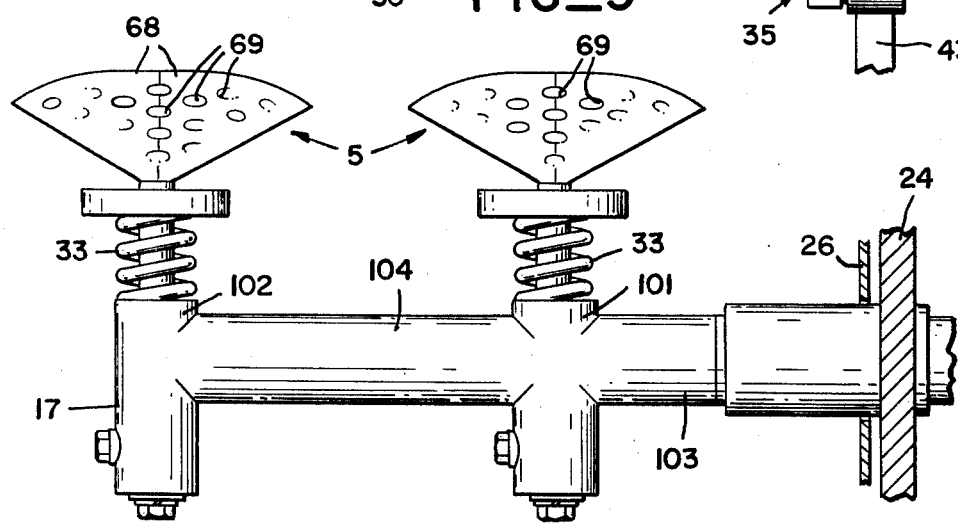
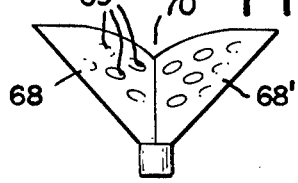
INVENTORS
ETHERIDGE R. McCLELLAND
HENRY L. SPENCE
BY
Boyken, Mohler, Foster & Schlemmer
ATTORNEYS

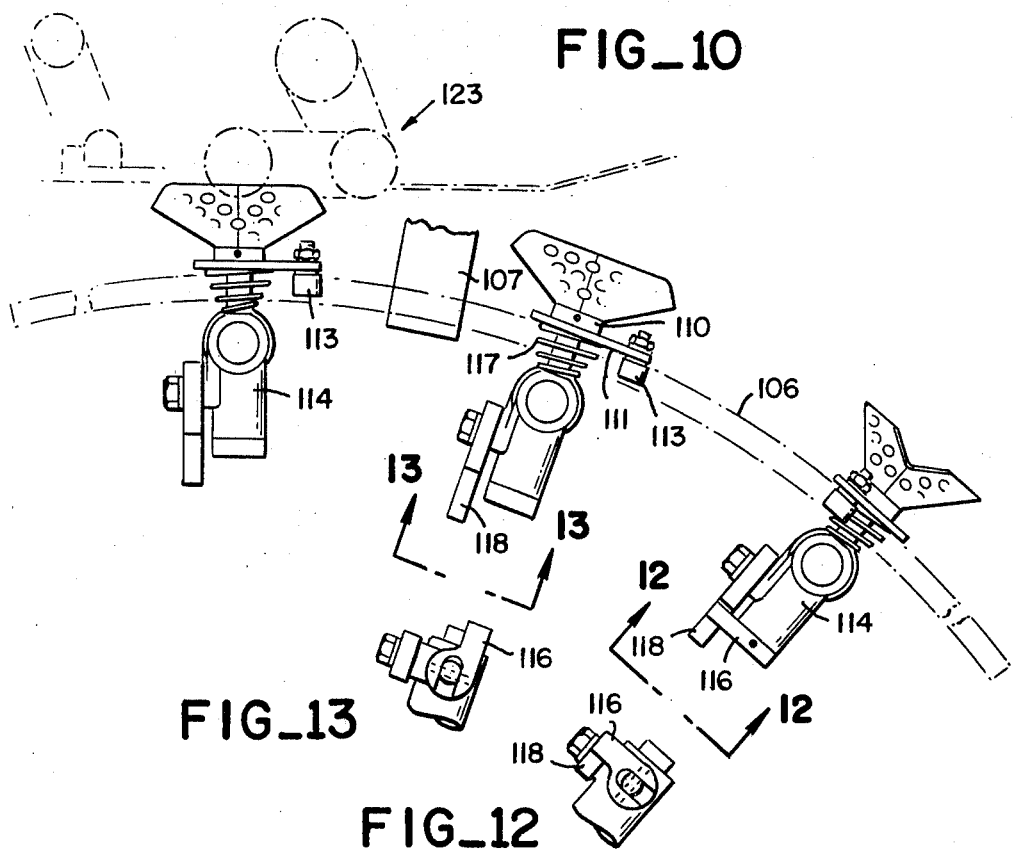
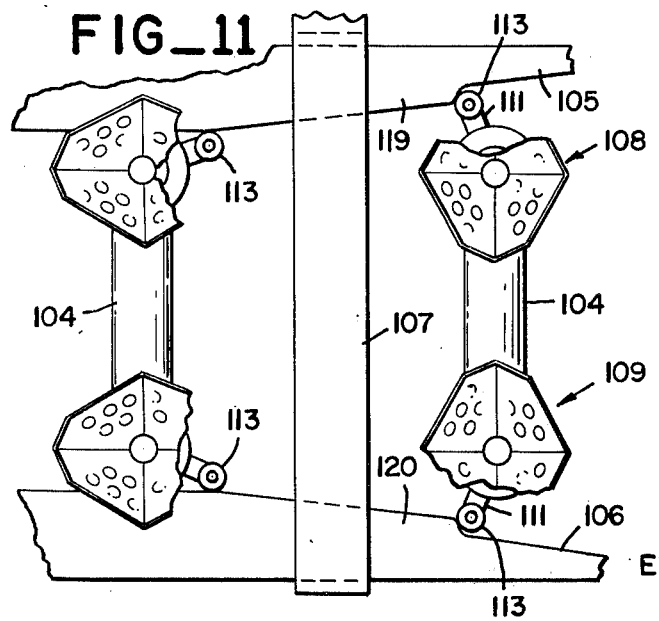
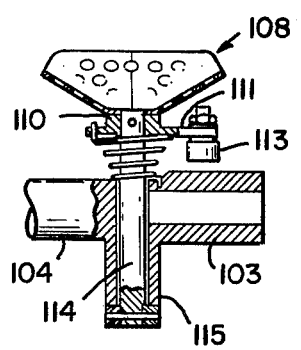

United States Patent Office 3,503,485
Patented Mar. 31, 1970

3,503,485
APPARATUS FOR AUTOMATICALLY FEEDING, ORIENTING AND PITTING DRUPE HALVES AND METHOD
Etheridge R. McClelland, Hayward, and Henry L. Spence, Dublin, Calif., assignors to Filper Corporation, San Ramon, Calif., a corporation of California
Filed Nov. 14, 1967, Ser. No. 682,813
Int. Cl. B65g 47/24
U.S. Cl. 198—33        16 Claims

ABSTRACT OF THE DISCLOSURE

A feeder for unpitted drupe halves, including means continuously movable in a closed path for passage in one direction through a mass of indiscriminately arranged unpitted drupe halves, for picking up individual halves from said mass, then carrying each half to a pitter, and orienting said half on the way to the pitter so each half will be presented to the pitter for automatic removal of the pit half by the pit removing means on the pitter.

BACKGROUND OF INVENTION

The bodies of drupes, such as clingstone peaches, are bisected, and, by the torque system of pitting, the whole or half pits therein are normally removed by effecting relative movement between the pits and the drupe halves in which the pits are held. However, where the pits in the whole drupes split during their development, they are not readily removed by the torque system of pitting, and there are times when the whole drupes remain in the pit cavities.

The drupe halves that remain unpitted, as above described, have heretofore required individual manual handling for positioning them for pitting.

By the present apparatus and method, the unpitted halves are automatically individually picked up from a group of indiscriminately arranged unpitted halves, oriented and conveyed to a pitter and pitted without manual handling, thus cooperating with a torque-type pitter to pit all drupes, whether the pits in the bodies of the bisected drupes are whole or split, and such pitting is accomplished without loss of time and added expense, due to manual handling of the drupe halves.

Hereinafter the word "pit" will be understood to mean whole or half pits.

SUMMARY

In the present apparatus, an indeterminate number of unpitted drupe halves in indiscriminate arrangement are collected in a group, and carriers or cup-like drupe supports are moved along a path of travel into and upwardly through such group to pick up one of said drupe halves in each support.

Hereinafter such supports may be called "cups" for purpose of identification, and said path of travel extends to and past a pitter. Each cup-supported drupe is oriented during movement in its path to the pitter so that the cut face of each drupe and the pit in the pit cavity opening into the cut face are directed generally upwardly for presentation to the pitter that includes a pit removing element that, in turn, removes the pit. After the pit is removed, each cup continues in its path and ejects the pitted drupe half therefrom, and then repeats the cycle.

BRIEF DESCRIPTION OF DRAWINGS

FIG. 1 is a greatly reduced semi-diagrammatic elevational front view of the machine, in which the path of movement of the drupe carriers is indicated, and an inlet and outlet for the drupe halves and pits as well as the pitting station.

FIG. 2 is an enlarged view of the front side of the machine, one portion being broken away and in cross section.

FIG. 3 is a side-elevational view of the machine with certain parts omitted to avoid confusing details and with the tank for water in cross section.

FIG. 4 is an elevational view of the rear side of the machine, partly in cross section and having some parts broken away.

FIG. 5 is a fragmentary view of a plurality of the cups being oscillated on the way to the pitting head.

FIG. 6 is an enlarged, fragmentary cross-sectional view showing one of the cups at the pitting head.

FIG. 7 is a top plan view of the cup shown in FIG. 6.

FIG. 8 is an end elevational view of the cup shown in FIG. 6, as seen at a right angle to the latter.

FIG. 9 is a fragmentary elevational view of a portion of the parts shown in FIG. 6 and in which a pair of cups are provided instead of only one.

FIG. 10 is a fragmentary elevational view of a modification of FIG. 9 providing for a quarter turn of the cups of FIG. 10.

FIG. 11 is a fragmentary top plan view of a portion of FIG. 10.

FIG. 12 is a lower end view of one of the cup supports as seen from line 12—12 of FIG. 10.

FIG. 13 is a lower end view of one of the cup supports as seen from line 13—13 of FIG. 10.

FIG. 14 is a fragmentary part sectional, part elevational view of one of the cups of FIGS. 10, 11.

FIG. 15 is a schematic top plan view of a drupe half in oriented position in a cup.

DESCRIPTION OF THE INVENTION

The stationary frame elements of the machine are generally designated 1, and the operation of the machine, in a broad sense, may be clearly understood by reference to the FIG. 1 in which a vertically disposed wheel 2 is supported on a central horizontal shaft 3 for rotation about the latter in the direction indicated by the arrow 4.

A plurality of cups 5 are respectively pivotally supported on wheel 2 for rotation of each cup about a horizontal axis parallel to the axis of shaft 3.

The lower portion of wheel 2 is immersed in water 6 in a tank 7 and the unpitted drupe halves 8 may be fed into tank 7 by any suitable conveyor or chute 9 for floating in the water 6.

Upon rotation of wheel 2, the individual cups 5 are carried in an annular path of travel about the axis of shaft 3 downwardly into and generally horizontally through the water 6 and upwardly out of said water, each picking up an unpitted floating drupe half 8 upon movement upwardly and out of the water, and which drupe half is carried upwardly to a pitting device generally designated 10 (FIG. 2) that is positioned on frame 1 at the top of the annular path of travel of the cups 5.

After a drupe half is picked up by a cup 5, and during its movement from the water to the pitting device 10, each cup 5 is oscillated about its horizontal axis of rotation through a connection with power-driven mechanism, generally designated 12. The construction of each cup and the oscillating means will be described in detail later on, but the connection between the mechanism 12 and the cups 5 is such that upon oscillating the cups during movement to the pitter or pitting head, each drupe half will still be in each cup before the latter reaches the pitting head, and centered in each cup with its cut or planar side facing upwardly for presentation to the pitter 10 for removing the pit.

The pitter, with its pitting element, moves with the cup during pitting, and returns to pit the drupe half in the next cup as the wheel carries the next cup and drupe half to the pitting station. Oscillation of the cup ceases before the drupe reaches the pitter and each drupe is presented to the pitter with its cut face directed upwardly.

After leaving the pitter, each cup is flipped over to eject the drupe half into a discharge chute 14, completing the operation isofar as the present machine is concerned.

FIG. 2 shows cups 5 in one of their positions on wheel 2 at one of their several points in their path of travel, while FIG. 5 illustrates the oscillatory movement of the cups at the right-hand portion of FIG. 2 during upward movement of the cups from the body of water 6 to the pitter. This oscillatory movement orients the drupe halves.

Each cup 5, when in a position for carrying a drupe half, is generally in the form of a hollow upwardly opening, polysided cone (FIGS. 6–8) having a projection 15 at the lower convergent ends of its sides pinned or otherwise suitably secured to one end of a post 16 that, in turn, is reciprocably supported in the tubular cross head 17 of a hollow T-fitting generally designated 18. The leg 19 of said fitting 18 extends horizontally at a right angle to head 17, and is secured on one end of the horizontal shaft 20, which shaft, in turn, is rotatably supported and extends through a bearing 23.

Wheel 2 includes spokes 24 (FIGS. 4–6) extending radially relative to shaft 3, and said spokes are rigid with a central hub 25, (FIG. 3) that is secured to central shaft 3. A circular cover plate 26, coaxial with shaft 3, across the front sides of spokes 24 (FIGS. 2, 6) is rigid with the latter.

The use of the words "front," "forward," "forwardly," "rear," and "rearwardly," and words of similar connotation, are used with reference to the wheel 2, the cups 5 being at the front or forward side of wheel 2 and the opposite side of the wheel is the rear side.

Bearings 23 (FIG. 6) are rigid relative to spokes 24 and plate 26, and shaft 20 projects rearwardly therefrom. The cross heads 17 having posts 16 therein are at the forward side of the wheel 2, and a pin or screw 27 on each cross head extends into a groove 28 formed in a side of each post, extending longitudinally of the latter, to permit longitudinal movement of each post in each cross head, while inhibiting rotation of cup 5 about the axis of each post.

A washer 29 is held by a screw 30 on the end of post 16 opposite to each cup 5 to hold the post against withdrawal from the cross head 17 out of the end thereof adjacent to cup 5, and a coil spring 33 reacts between cross head 17 and an annular disc 34 secured on post 16 adjacent to cup 5 to yieldably resist movement of the cup toward the cross head from the outermost position of the cup.

At the rear side of wheel 2, the end of each shaft 20 has a crank 35 (FIG. 4) secured thereto. Each crank 35 has a pair of arms 36, 37 extending at a right angle to each other with arm 37 extending radially outwardly of the axis of shaft 20, the shaft 20 being secured to the crank at the juncture between arms 36, 37. A cam follower 38 is secured to the outer end of arm 36, and a corresponding cam follower is secured to the outer end of each arm 39, said followers being rotatable about axes parallel with the axis of rotation of wheel 2.

Supported in a vertical plane and in positions at the rear of wheel 1 are several cams 42, 43, 44. Cam 42 extends arcuately, and generally vertically, around the axis of shaft 2 at the right-hand side, as viewed in dotted lines in FIG 2, but the arc is eccentric relative to said axis being more distant from said axis at its lower end than its upper end. Cam followers 38 are each yieldably held against the arcuately extending outer edge of said cam 42 by a spring 45 during movement of the cam followers upwardly as wheel 2 is revolved counterclockwise as viewed in FIG. 2. Springs 45 each connect one of the cranks 35 with a spoke in a position to so hold follower 38 against cam 42. The cam followers 38 will each be in trailing relation to the axis of shaft 20 with arms 37 projecting generally radially outwardly relative to shaft 3. When said cam followers 38 are in engagement with cam 42, the cups 5 will be held with their open sides facing upwardly, although they will be oscillated by reason of oscillation of cam 42, generally as indicated in FIG. 5.

The power driven oscillatory mechanism 12 is a rotor (FIG. 2), mounted on frame 1 at a level above wheel 2 and includes a pin 47 eccentrically positioned on a rotary shaft (FIG. 4) having a pulley 48 thereon. A belt 49 connects pulley 48 with motor 50 connected with a Reeves, or expanding V-belt pulley 51 for rotating the rotor shaft at the desired rate of speed.

A connecting rod 53 (FIG. 4) is connected at one end to pin 47 and the opposite end is pivotally connected to the horizontally extending arm 54 of a crank 55 while the other arm 56 of the crank extends downwardly. A pivot 58 on a frame member 59 pivotally supports the crank 55 thereon. A bracket member 60 extends horizontally from and rigid with cam 42, which member is pivotally connected to the outer end of the arm 56 of crank 55.

Bracket member 60 is adjacent to the upper end of cam 42 and a second bracket member 63 adjacent to the lower end of cam 42 is connected with one arm of a lower crank 64 that is identical with crank 55, and the other arm of said crank is pivotally connected with an extension 65 of the connecting rod 53.

Intermediate the upper and lower ends of cam 42, a stabilizing fork 67, rigid with cam 42, slidably receives a projection 66 on frame member 59 (FIG. 4) between the fork members for stabilizing the cam during horizontal oscillation as rod 53 is reciprocated.

When each cam follower 38 is held against cam 42 by a spring 44 and the wheel is rotated counterclockwise in FIG. 2 or clockwise in FIG. 4, the cups 5 will be in a position for supporting a drupe half therein, but said cups will be oscillated as indicated in FIG. 5. The cups are in neutral positions in FIGS. 1, 2.

The shape of each cup and its position relative to the direction of its oscillatory movement are important, inasmuch as the drupe halves must stay in the cups during their upward movement and must quickly position themselves so their cut faces are directed upwardly.

As already mentioned, each cup is generally a polysided hollow cone. Each cup is horizontally elongated in a direction at a right angle to the direction in which it is vibrated or oscillated and it is symmetrical at opposite sides of a plane bisecting shaft 20 longitudinally of the latter and bisecting the cup, so that the major horizontal axis of each cup is along line x—x (FIG. 7) and its minor axis is along line y—y. The pair of walls 68 at one side of the major axis are flat-sided, as are the pair of walls 68' at the other side of said axis, and the upper edges of said pairs of walls curve downwardly at the ends of the cup on said major axis to form a depressed notch 70 (FIG. 8).

By this structure, the cup 5 is four sided and the pair of walls 68 join each other at an obtuse angle, as do the pair of walls 68', while walls 68 join walls 68' at an acute angle.

A drupe half within the cups, when the latter is oscillated as described, will not only quickly position itself in each cup with its cut face directed upwardly, but the blossom-stem axis of each half will normally be along the major axis of the cup, since the dimension of each peach half is greatest in the direction of the blossom-stem axis.

Cam 44 (FIG. 4) is at the side of shaft 3 opposite to cam 42, and cam 44 is stationarily held on a frame member 74 that is parallel with frame member 59. Cam 44 is concentric with the axis of shaft 3.

Extending horizontally adjacent the upper ends of cams 42, 44, is a side opening arcuately extending cam 43. The end portion of cam 43, adjacent to the upper end of cam 42, is spaced above the upper end portion of cam 42 in vertically lapping relation, with one open end of the channel of said cam in a position to receive the cam follower 39 on each crank 35 as each follower 38 leaves cam 42.

As the wheel rotates counterclockwise, as seen in FIG. 2, or clockwise in FIG. 4, when cam follower 39 is in the channel-cam 43, the cup 5 on each cross head 17 will have ceased to oscillate and the open upper drupe holding side of the cup will be directed vertically upwardly for positioning the flat upper face of the drupe against the underside of a horizontally extending slotted plate 75 (FIGS. 2, 6) of the pitter mechanism 76 of the pitter 10 that includes a conventional rotary pitting blade 77 adapted to revolve through the slot 78 in plate 75 and around the pit in the drupe half to sever the pit from the drupe half.

The pitter mechanism 76 is pivotally suspended from pivots 79 for movement of the slotted plate 75 in a line in the direction of movement of the cup 5, and with said cup, as the wheel 2 revolves, the blade 77, cutting the pit from the peach half, and pitter mechanism move together. There is nothing novel about this type of pitter mechanism, a suitable one being disclosed in U.S. Patent 2,705,037 of Mar. 29, 1955, to R. D. Fox and E. R. McClelland.

The upper end of cam 44 is spaced from the exit end of the channel cam 74 and just as the cam follower 39 leaves the cam 74, the cam follower 38 will engage the adjacent rounded end 80 (FIG. 4) of cam 44, and the crank 35 will be quickly rotated counterclockwise in FIG. 2 to eject the pitted drupe half into discharge chute 14 (FIG. 1). The cups 5 will be held in inverted positions during downward movement of the cups along cam 44 and then will face the direction of travel of the cups through the water 6 below the upper level of the latter (FIG. 2) until each cam follower 38 engages the lower end of cam 42 when the cups will have their open sides directed upwardly to pick up a drupe half floating on the body of water 6.

An arcuately extending, vertically disposed baffle plate or partition 81 (FIGS. 3, 4) is stationary in tank 7 extending to the bottom and end walls of the latter and disposed close to the cover plate 24, the ends of which baffle plate terminate a substantial distance above the level of water 6, to prevent any drupes from passing the edges of plate 24 and getting into any of the parts of the wheel at the side of the latter opposite to the cups. The arcuately extending marginal portion of plate 81 as seen in FIG. 3 is in lapping relation to the annular outer marginal portion of plate 24.

In moving through the water in tank 7, the cups 5 will effect a movement of the water toward the end of the tank where the drupes are picked up by the cups, and to prevent piling up of the drupes at said end of the tank, a rapid circulation of the water at said end sufficient to prevent an objectionable piling of the drupes, is effected by positioning a horizontally spaced inlet and outlet, 82, 82' (FIG. 2) from a circulating water pump (not shown) in the end wall of the tank that is adjacent to the pick-up point so as to maintain a replacement drupe for each that has been picked up, and at the same time preventing a pile-up.

A motor 83 drives an expanding V-belt pulley 84 (FIG. 2) similar to pulley 51, which pulley 84 is connected by a belt 85 with a pulley 86 that, in turn, is on a shaft 87 connected by gears (not shown) in a gear box 88, with a shaft 89 (FIG. 4) having a sprocket wheel 90 (FIG. 4) thereon. Sprocket wheel 90 is connected by chain 91 and sprocket wheel 92 and by gears, including gears 93 (FIGS. 2, 6), with a shaft 94 (FIG. 6) that, in turn, connects with the pit removing blade or element for removing the pits from the drupe halves.

Also connected with shaft 89 by gears (not shown) in gear box 88 is a shaft 95 (FIGS. 4, 6) having a sprocket wheel 96 thereon. Said sprocket wheel 96 is connected by a chain 97 (FIG. 4) with a sprocket wheel 98 secured on shaft 3.

The timing of the drive including the belts and chains is such that a drupe half 8 is in a position for removal of its pit during movement of the drupe half in its path of travel and during movement of the plate 75 of the pitter. The drupe half is yieldably held against plate 75 during movement of the drupe half in its annular path of travel and during the generally linear movement of the plate 75 by springs 33.

The perforations 69 in each cup 5 is to permit passage of the water therethrough with least resistance during movement of the cups through the body of water 6 to drupe engaging relation so that each cup will pick up a drupe half instead of forcing it ahead of each cup, and also the water will drain from the cups.

As already noted, the word "cup" herein used is intended to cover any drupe pick-up structure that will function in the same manner as the cup hereinbefore described.

Preferably, a perforated false bottom wall 99 (FIG. 2) is spaced between the path of travel of the cups through the water and the bottom of the tank 7, which wall 99 is curved to be substantially parallel to said path of travel.

The pertinent feature of the cups 5, or their equivalents, is that they will each pick up a single, unpitted drupe half irrespective of the position of the half, and upon said generally oscillatory movement of the cup, but will be shifted to a position in which the hemispherical lower surface of each half will be supported against the walls of a cup and the cut face of the drupe half will face upwardly, and when in this position, the drupe will remain with its cut face directed upwardly. As already mentioned, the drupe halves will also normally position themselves with their longer stem-blossom axes parallel with the axis about which each cup is oscillated, agitated or shaken in a generally horizontal direction transversely of the axis of oscillation of each cup.

The manner of operation of the apparatus as described, or the steps performed, comprise the automatic feeding of substantially hemispherical drupe halves, each having a planar cut face with an exposed pit therein, from a plurality of indiscriminately positioned halves, in timed, one-by-one, spaced relation to a pit removing station, by floatingly supporting said drupe halves in a body of liquid, in a position across a predetermined path extending through said body with their cut face in indiscriminate relation to each other. This arrangement of halves is the result of feeding halves into the tank of water without regard to positioning the halves.

The individual drupe halves are upwardly removed from said path at spaced intervals and are conducted in a row, one after another, in an upwardly extending row to a pitting station.

The drupe halves that are in the body of liquid are moved into the path in said body to replace the ones removed from said path, to maintain a substantially continuous row going to said pitting station, and the drupe halves in the row are bodily shifted prior to reaching said station, until their hemispherical sides face downwardly, and thereafter and while the cut faces of the drupe halves face upwardly, the pits are removed.

The supporting of each drupe half in the row may be said to preferably include the step of restricting the support to spaced pairs of substantially equally spaced points c (FIG. 15) disposed on parallel pairs of lines a and b extending perpendicular to each other, and the step of shifting and orienting the halves is preferably effected by oscillating the points of support of said pairs transversely of the longitudinal axis x—x of each cup and generally horizontally as indicated by the double headed arrows in FIG. 5 and at d in FIG. 15 until the hemispherical surface of each drupe half is against all of said points of support c and each half is substantially balanced on said points. It should be noted that the pairs of points c on the pair of lines b are closer together than the spacing between said points on lines a, due to the obtuse angles at which sides 68, 68' meet on the minor axis y—y and the acute angles at which said sides meet on the major axis x—x.

Structurally, the aforesaid points are on the flat sides of the inverted conical cups, as distinguished from curved circular surfaces of a conventional cone or cup. The halves must not only stay in the cups irrespective of their positions when picked up, but they must remain in oriented position after that position is reached irrespective of agitation or oscillatory movement of the cups.

In the form of the invention disclosed in FIG. 6, only one cup 5 is supported on each shaft 20, and the peach half, which is designated 100, is presented to a single pitting blade 77 for removal of the pit.

In FIG. 9 a pair of vertically disposed cross heads 101 and 102 are provided and a cup 5 is supported on each cross head by the same structure as shown in FIG. 6. An arm 103, corresponding to arm 1a of FIG. 6, extends from cross head 101 and is secured to a shaft corresponding to shaft 20.

At the opposite side of cross head 101 from arm 103, an arm 104 extends in axial alignment with the arm 103 and has cross head 102 at its outer end for supporting one of the two cups, as above explained.

Obviously, the pitting mechanism for the structure of FIG. 9 would include a second pit removing blade (not shown) corresponding to blade 77 (FIG. 6) and operating simultaneously therewith for removing the pit from a peach half supported in each cup 5.

It will be apparent that in FIGS. 6, 7, the pitting blade will revolve about an axis that is parallel with the blossom-stem axis of a drupe and pit thereon.

In some instances it is desirable that the pitting blade enter the drupe half at the stem or blossom end of the pit, in which case its path of revolution will be about an axis extending transversely of the blossom-stem axis of the pit.

In FIGS. 10–14 a pair of elongated arcuately extending cam members 105, 106 (FIG. 11) are secured by any suitable brackets 107 to frame members 74 (FIG. 4) or to any other suitable stationary portion of the machine. Said members extend coaxially with the annular paths of travel of the cups, which are of the same structure as cups 5 in FIGS. 7–9, and in FIGS. 10–14 the cups of the inner row are generally designated 108 while those of the outer row are designated 109, the outer row being those in the row that are outermost relative to arms 103, 104 that correspond to arms 103, 104 in FIG. 9.

As seen in FIG. 14, instead of a plain disc 34 shown in FIG. 6 just below cup 5, each of the cups 107, 108 shows a disc or washer-like element 110 provided with an arm 111 projecting laterally therefrom, and each arm carries a cam follower 113 at its outer end.

A post 114 corresponds to each post 16 and cross heads 115, substantially correspond to cross heads 101, 102 of FIG. 9.

Posts 114 respectively extend through cross heads 115 and each has an arm 116 (FIGS. 12, 13) projecting laterally therefrom and a post 114 is rotatable in each cross head.

A torsion spring 117 is connected at one end with each cross head (FIG. 14) and at the opposite end with the disc 109, which spring functions to yieldably urge the cup outwardly, the same as springs 33 in FIGS. 6, 9, and to also yieldably hold each arm 116 against a stop member 118 that is rigid with each cross head 115, and to return the post 114 and cups 108, 109 when the cups are rotated from positions corresponding to the positions of cups 5 in FIG. 9.

The inner cam track 105 is parallel with a rise 119 (FIG. 11) along the length thereof commencing with a point between the time the oscillating orienting movement of the cups cease and the cups reach the pitting station, and the outer cam track 105 is provided with a similar rise 120.

Arms 111 connected with the posts 114 are positioned so that the followers 113 upon engaging the risers 119, 120, which occurs substantially simultaneously, will rotate the cups 108 and 109 a quarter turn to position them with their major axis generally parallel with the paths of movement of the cups, thus presenting the drupe halves to the pitter indicated in dot-dash lines 123 in FIG. 10, with the blossom-stem axis of the pits extending transversely of the axis of rotation of the pitting blades.

As soon as the pits have been removed, the cam followers 113 will move off the cam risers 119, 120 and the torsion springs 117 will return the cups to their original positions, in which arms 116 (FIG. 12) will be against the stop members 118.

In practice, the number of drupe halves that are in the tank 7 will be substantially more than are disclosed, so that each cup, whether one or more, will pick up a drupe irrespective of the rate of travel of the cups.

Again it is emphasized that the word "pit" is intended to include whole as well as half pits, and an "unpitted" drupe half is one in which either a whole or a half pit is in the pit cavity of the half drupe.

While the invention is applicable principally to clingstone peaches, the word "drupe" is intended to apply to any fruit or the like with which it may be used, and insofar as the orienting step is concerned, it is to be understood that the word drupe applies to those drupes, such as peaches in which the body is longer in the dimension of the blossom-stem axis than in the dimension perpendicular thereto.

It will be understood that changes may be made in the details of construction, arrangement and operation without departing from the spirit of the invention, especially as defined in the following claims.

We claim:

1. The method of orienting drupe halves having a convex, generally hemispherical outer surface extending to a planar cut face in a plane in which the blossom-stem axis of the drupe and pit is disposed, and which is the major axis of the drupe, for positioning said cut faces directed upwardly with said axes extending in substantially the same direction, that includes the steps of:
    (a) supporting each half from below at pairs of spaced points against said hemispherical outer surface in which two pairs of said points are on parallel spaced lines disposed in side-by-side relation with the points spaced apart substantially the same distance in each of said lines, and with the points of said two pairs also in parallel spaced lines disposed in side-by-side relation and extending perpendicular to said first-mentioned lines, but spaced apart a lesser distance than said first-mentioned spacing;
    (b) then rapidly moving said points of support back and forth generally horizontally in the direction of said lines of lesser spacing whereby each drupe half so supported will move relative to said points to automatically position itself with its major axis substantially parallel with the lines of wider spacing.

2. The method as defined in claim 1, in which a pit is held in the pit cavity in the cut face of each drupe;
    (c) stopping said back-and-forth movement of each drupe half after its major axis is substantially parallel with said last-mentioned lines, and thereafter;
    (d) holding each drup half against said back-and-forth movement and removing said pit from its pit cavity.

3. The method as defined in claim 1;
    (c) restricting the movement of each drupe half relative to said points to positions in which it is substantially supported at said points during said movement, and thereafter;

(d) holding each drupe against said back-and-forth movement.

4. The method of automatically orienting and feeding substantially hemispherical drupe halves each having a planar cut face with an exposed pit therein, from a plurality of indiscriminately positioned halves, in timed one-by-one spaced relation comprising the steps of;

(a) floatingly supporting said drupe halves in a body of liquid in a position across a predetermined path extending through said body, with their cut faces in indiscriminate relation to each other;

(b) removing individual drupe halves at spaced intervals upwardly from said path and conducting them, in an upwardly extending row, one after the other;

(c) moving the drupe halves in said body into said path after removal of a drupe half from said path to replace each drupe half removed therefrom;

(d) positioning each drupe half in said row with its cut face and pit facing upwardly, by bodily shifting each half, not so positioned, until its hemispherical side faces downwardly;

(e) each of said halves being supported from below during movement from said body.

5. In the method as defined in claim 4;

(f) orienting each drupe half during the step of shifting the latter to position its cut face and pit upwardly, to position the blossom-stem axis of the pit in each half in the same direction.

6. In the method as defined in claim 5;

(g) the supporting of each drupe half in said row including restricting the support to spaced pairs of substantially equally spaced points disposed on parallel pairs of lines extending transversely to each other, and (h) said step of shifting and orienting said halves being effected by similarly oscillating the points of support of said one of said pairs in one plane until the hemispherical surface of each drupe half is against all of said points of support and each half is substantially equally supported on said points.

7. In the method as claimed in claim 4;

(f) said moving of said drupe halves into said path being effected by establishing a current in said body toward the point of removal of halves therefrom to carry halves across said path.

8. An automatic feeder and positioner for unpitted drupe halves each having a substantially hemispherical outer surface and a substantially planar cut face having a pit cavity with a pit therein, comprising;

(a) a generally cup-like support adapted to loosely support an unpitted drupe half therein when said support is in an upright position, (b) a body of liquid for floatingly supporting a plurality of unpitted drupe halves therein.

(c) means for supporting said cup-like support for movement in, and upwardly from said body in an upright position and for movement along a predetermined path of travel for picking up an unpitted drupe half floatingly supported in said body and for carrying it along said path of travel;

(d) means for agitating said cup-like support during its movement along said path for shifting a drupe half therein until the hemispherical surface of said drupe half faces downwardly and (e) said support including means in engagement with said hemispherical surface for maintaining said drupe half in a position with its said surface facing downwardly after the drupe half has been shifted to said position.

9. In apparatus as defined in claim 8;

(f) said support being supported for oscillatory movement during its movement along said path and said means for agitating said support being connected with the latter for oscillating the latter for providing said agitation.

10. In apparatus as defined in claim 9;

(g) each cup-like support being longer in one horizontal direction than in a horizontal direction at a right angle thereto and said walls being in two pairs with walls of said pairs joined along vertical planes extending at a right angle to each other when said support is upright with the longer dimension of said support being in one of said planes, and the upper edges of said walls at the ends of said support in said longer dimension, extending downwardly to define the edges of upwardly opening recesses at said last-mentioned ends.

11. In apparatus as defined in claim 8;

(f) each of said cup-like supports being substantially an inverted hollow cone having flat side walls when in upright position, whereby the hemispherical surface of a drupe half therein will have point contacts with said walls when in the latter and when said surface faces downwardly, and perforations formed in said walls to pass said liquid therethrough and to drain liquid therefrom.

12. An automatic feeder and positioner for unpitted drupe halves each having a substantially hemispherical outer surface and a substantially planar cut face having a pit cavity with a pit therein, comprising;

(a) a tank having a body of water therein for floatingly supporting a plurality of said drupe halves therein in indiscriminate relation with respect to their cut faces, (b) an endless row of drupe supports each adapted to support a drupe half loosely therein when each support is in upright position, and to support each drupe half in a position with its cut face directed upwardly when each drupe half is in said last-mentioned position, (c) means supporting the drupe supports of said row for cyclic movement successively in one direction into said body, and along a path therein, and upwardly out of said body for picking up one of the halves in the latter, and downwardly back into said body, (d) means connected with said row of supports for so moving the latter in said one direction, (e) control means for maintaining each support upright during upward movement out of said body, (f) each of said supports including means stationary relative thereto in engagement with a drupe half supported therein for automatically positioning each such half with its hemispherical surface facing downwardly and with its cut face directed upwardly upon agitation of each support to bodily shift the drupe half relative to said support, irrespective of the initial position of said hemispherical surface and cut face, (g) means for so agitating each support of said row between said body of water and said pitter for so positioning the drupe half in each support, (h) a second control means operatively connected with said support for tipping each of the latter from its upright position upon said downward movement of said supports to discharge the drupe half therefrom and before movement of said supports into said body of water.

13. In apparatus as defined in claim 12;

(i) each of said supports including means for orienting each drupe half with the blossom-stem axis of the pits therein disposed in the same direction during said agitation of said drupe halves.

14. In a feeder and positioner as defined in claim 12;

(i) the means for automatically positioning each of said drupe halves with their cut faces directed upwardly comprising a plurality of flat side walls extending convergently downwardly providing a plurality of spaced point contacts with a drupe half in each support, and the means for agitating each support including a member supported for oscillatory movement operatively connected with said walls for oscillating the latter.

15. In a feeder and positioner as defined in claim 14;
(j) a vertically disposed turret supported for rotation about a horizontal axis and said supports being in an annular row coaxial with the axis of rotation of said turret and supported on said turret adjacent to the outer periphery thereof for said oscillatory movement about axes parallel with the axis of rotation of said turret.

16. In a feeder and positioner for unpitted drupe halves each having a substantially hemispherical convex outer surface and a substantially planar cut face having a pit cavity with a pit therein, and a major stem-blossom axis, and orienting means comprising;
(a) a generally cup-like support for drupe halves having a plurality of drupe engaging elements disposed around a generally vertical axis respectively adapted to engage said convex surface of a drupe half at spaced points for supporting such drupe half with its cut face directed upwardly,
(b) said support having horizontal major and minor axes disposed substantially at a right angle to each other in a horizontal plane with said points of engagement with said convex surface of a drupe half being horizontally more widely spaced from each other in the direction of said minor axis of said support than horizontally in a direction at a right angle to said minor axis,
(c) means connected with said cup-like support for rapidly moving it generally horizontally back-and-forth in the direction of said minor axis whereby a drupe supported thereon will engage said points and will position itself with its blossom-stem axis generally parallel with the major axis of said support.

References Cited
UNITED STATES PATENTS
2,572,773   10/1951   Slagle _____ 198—33

EDWARD A. SROKA, Primary Examiner